(12) United States Patent
Twitchell, Jr.

(10) Patent No.: US 7,539,520 B2
(45) Date of Patent: May 26, 2009

(54) REMOTE SENSOR INTERFACE (RSI) HAVING POWER CONSERVATIVE TRANSCEIVER FOR TRANSMITTING AND RECEIVING WAKEUP SIGNALS

(75) Inventor: Robert W. Twitchell, Jr., Cumming, GA (US)

(73) Assignee: TeraHop Networks, Inc., Alpharetta, GA (US)

( * ) Notice: Subject to any disclaimer, the term of this patent is extended or adjusted under 35 U.S.C. 154(b) by 555 days.

(21) Appl. No.: 11/425,040

(22) Filed: Jun. 19, 2006

(65) Prior Publication Data

US 2006/0287008 A1 Dec. 21, 2006

Related U.S. Application Data

(60) Provisional application No. 60/691,718, filed on Jun. 17, 2005.

(51) Int. Cl.
*H04B 1/38* (2006.01)

(52) U.S. Cl. ............. 455/574; 455/343.1; 455/553.1; 455/88; 455/9; 370/318

(58) Field of Classification Search ............ None
See application file for complete search history.

(56) References Cited

U.S. PATENT DOCUMENTS

| | | | |
|---|---|---|---|
| 4,613,990 A | 9/1986 | Halpern |
| 4,680,583 A | 7/1987 | Grover |
| 5,040,238 A | 8/1991 | Comroe et al. |
| 5,054,052 A | 10/1991 | Nonami |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |

(Continued)

FOREIGN PATENT DOCUMENTS

EP 0467036 A2 1/1992

(Continued)

OTHER PUBLICATIONS

Gary Morgan, Miniature Tags Provide Visibility & Cohesion for an LIA Battalion Level 'Proof of Principle', Pacific NW National Laboratory, Apr. 2001, Gary.morgan@pnl. gov.

(Continued)

*Primary Examiner*—Tan Trinh
(74) *Attorney, Agent, or Firm*—Tillman Wright, PLLC; Chad D. Tillman; James D. Wright

(57) ABSTRACT

A device for receiving and transmitting wireless signals includes a transceiver capable of receiving a wireless signal; and a standards-based radio capable of activation thereof in response to a reception of a wireless signal by the transceiver. The transceiver includes a receiver capable of receiving a wireless signal transmitted to prompt activation of said standards-based radio; and a transmitter configured, in response to a reception by said receiver of a wireless signal transmitted to prompt activation of said standards-based radio, to selectively transmit a wireless signal for another transceiver to prompt activation of another standards-based radio.

20 Claims, 5 Drawing Sheets

U.S. PATENT DOCUMENTS

| | | |
|---|---|---|
| 5,400,254 A | 3/1995 | Fujita |
| 5,425,051 A | 6/1995 | Mahany |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,077 A | 3/1998 | Whitehead |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,890,054 A | 3/1999 | Logsdon et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,473,607 B1 | 10/2002 | Shohara et al. |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,600,418 B2 | 7/2003 | Francis et al. |
| 6,611,556 B1 | 8/2003 | Koerner et al. |
| 6,614,349 B1 | 9/2003 | Proctor et al. |
| 6,665,585 B2 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,745,027 B2 | 6/2004 | Twitchell, Jr. |
| 6,747,562 B1 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,934,540 B2 | 8/2005 | Twitchell, Jr. |
| 6,940,392 B2 | 9/2005 | Chan et al. |
| 6,975,614 B2 | 12/2005 | Kennedy |
| 7,012,529 B2 | 3/2006 | Sajkowsky |
| 7,027,773 B1 | 4/2006 | McMillin |
| 7,098,784 B2 | 8/2006 | Easley et al. |
| 7,103,344 B2 | 9/2006 | Menard |
| 7,126,470 B2 | 10/2006 | Clift et al. |
| 7,133,704 B2 | 11/2006 | Twitchell, Jr. |
| 7,142,121 B2 | 11/2006 | Chan et al. |
| 7,155,264 B2 | 12/2006 | Twitchell, Jr. |
| 7,191,934 B2 | 3/2007 | Miller et al. |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,212,122 B2 | 5/2007 | Gloekler et al. |
| 7,221,668 B2 | 5/2007 | Twitchell, Jr. |
| 7,230,933 B2 | 6/2007 | Bahl et al. |
| 7,317,382 B2 | 1/2008 | Pratt |
| 7,348,875 B2 | 3/2008 | Hughes et al. |
| 7,440,781 B2 | 10/2008 | Beach et al. |
| 2001/0000019 A1 | 3/2001 | Bowers et al. |
| 2002/0039896 A1 | 4/2002 | Brown |
| 2002/0098861 A1 | 7/2002 | Doney et al. |
| 2002/0119770 A1 | 8/2002 | Twitchell, Jr. |
| 2002/0146985 A1 | 10/2002 | Naden |
| 2003/0001743 A1 | 1/2003 | Menard |
| 2003/0008692 A1 | 1/2003 | Phelan |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0209601 A1 | 11/2003 | Chung |
| 2003/0236077 A1 | 12/2003 | Sivard |
| 2004/0021572 A1 | 2/2004 | Schoen et al. |
| 2004/0041731 A1 | 3/2004 | Hisano |
| 2004/0082296 A1 | 4/2004 | Twitchell, Jr. |
| 2004/0100415 A1 | 5/2004 | Veitch et al. |
| 2004/0121793 A1 | 6/2004 | Weigele et al. |
| 2004/0135691 A1 | 7/2004 | Duron et al. |
| 2004/0183673 A1 | 9/2004 | Nageli |
| 2005/0043068 A1 | 2/2005 | Shohara et al. |
| 2005/0048972 A1* | 3/2005 | Dorenbosch et al. ........ 455/436 |
| 2005/0088299 A1 | 4/2005 | Bandy et al. |
| 2005/0093702 A1 | 5/2005 | Twitchell, Jr. |
| 2005/0093703 A1 | 5/2005 | Twitchell, Jr. |
| 2005/0215280 A1 | 9/2005 | Twitchell, Jr. |
| 2005/0226201 A1 | 10/2005 | McMillin |
| 2005/0261037 A1 | 11/2005 | Raghunath et al. |
| 2006/0135145 A1 | 6/2006 | Redi |
| 2006/0270382 A1 | 11/2006 | Lappetelainen et al. |
| 2006/0276161 A1* | 12/2006 | Twitchell .................. 455/343.1 |
| 2008/0144554 A1* | 6/2008 | Twitchell .................... 370/310 |
| 2008/0236275 A1* | 10/2008 | Breed et al. ............... 73/290 V |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 1317733 A2 | 6/2003 |
| EP | 1692599 A2 | 8/2006 |
| EP | 1692668 A2 | 8/2006 |
| WO | WO0068907 | 11/2000 |
| WO | WO0069186 | 11/2000 |

OTHER PUBLICATIONS

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages. 1999.

http://www/iprg/nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAVs, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, Ad Hoc Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks: The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth—The Universal Radio Interface for Ad Hoc, Wireless Connectivity, Ericsson Review No. 3, pp. 110-117, 1998.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, Infocom 2004. 23rd Annual Joint Conference of the IEEE Computer and Communications Societies, vol. 3, 2004, pp. 1751-1761.

Stojmenovic et al., Design Giudelines for Routing Protocols in Ad Hoc and Sensor Networks with a Realistic Physical Layer, Communicatons Magazine, IEEE, vol. 43, Issue 3, Mar. 2005, pp. 101-106.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.

"Scalable Routing Strategies for Ad hoc Wireless Networks", Atsushi Iwata et al., IEEE Journal on Selected Areas in Communications, Special Issue on Adhoc Networks, Aug. 1999, pp. 1369-1379.

"Cluster Based Routing Protocol", Internet-Draft Mingliang, Jiang et al., National University of Singapore, Jul. 1999.

* cited by examiner

REMOTE SENSOR INTERFACE (RSI) HAVING POWER CONSERVATIVE TRANSCEIVER FOR TRANSMITTING AND RECEIVING WAKEUP SIGNALS

I. CROSS-REFERENCE TO RELATED APPLICATIONS

The present application is a nonprovisional of, and claims priority under 35 U.S.C. § 119(e) to Twitchell, U.S. Provisional Patent Application No. 60/691,718 filed Jun. 17, 2005. The entire disclosure of this patent application is hereby incorporated herein by reference.

II. INCORPORATION BY REFERENCE

The present application hereby incorporates by reference: U.S. Pat. No. 6,753,775 B2 (titled "Smart Container Monitoring System"); U.S. Pat. No. 6,745,027 B2 (titled "Class Switched Networks for Tracking Articles"); U.S. Pat. No. 6,665,585 B2 (titled "Method and Apparatus for Container Management"); U.S. Pat. No. 5,458,042 (titled "Container for Packaging an Object Provided with a Radio Frequency Transmission Device and Removable Element for Such a Container"); International Patent Application Publication No. WO 03/032501 A2, which international patent application designated the United States and was published in English (titled "Network Formation in Asset-Tracking System Based on Asset Class"); International Patent Application Publication No. WO 03/098851 A1, which international patent application designated the United States and was published in English (titled "LPRF Device Wake Up Using Wireless Tag"); U.S. Patent Application Publication No. 2005/0093703 A1 (titled "Systems and Methods Having LPRF Device Wake Up Using Wireless Tag"); U.S. Patent Application Publication No. 2005/0093702 A1 (titled "Manufacture of LPRF Device Wake Up Using Wireless Tag"); U.S. Patent Application Publication No. 2004/0082296 A1 (titled "Network Formation in Asset-Tracking System Based on Asset Class"); U.S. Patent Application Publication No. 2004/0183673 A1 (titled "Portable Detachable Self-Contained Tracking Unit for Two-Way Satellite Communication with a Central Server"); and U.S. Patent Application Publication No. 2004/0021572 A1 ("Electronic Baggage Tracking and Identification").

III. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

IV. FIELD OF THE INVENTION

The present invention generally relates to a remote sensor interface (RSI). RSIs are utilized for remotely collecting data in the field and communicating the collected data to one or more centralized locations. For example, RSIs are utilized in tracking or monitoring assets that are stored and/or transported in association with wireless transceivers, such as radio frequency identification tags (RFIDs). In such implementations, an RSI has been previously referred to as a wireless reader tag or WRT. The data regarding the tracked or monitored assets is communicated by an RSI to one or more central servers for processing. Such data is useful, for instance, in supply chain management. Such data further is useful, for instance, in homeland security, especially when the assets being tracked or monitored are being imported into the United States from foreign countries.

Of course, the RSI of the present invention preferably is capable of wireless communications with external devices. For example, the RSI preferably communicates with one or more other RSIs in forming one or more wireless networks. Furthermore, the RSI preferably communicates with one or more gateways, each gateway serving as an access point to one or more other networks, such as the Internet, a cellular network, or a Satellite network.

The present invention relates in particular to an RSI that includes a standards-based radio and a transceiver having components for transmitting as well as receiving wireless signals ("Wake-Up Transceiver"). The receiver of the Wake-Up Transceiver has a relatively low power consumption rate compared to the power consumption rate of the standards-based radio of the RSI, which preferably remains dormant until awoken by the Wake-Up Transceiver. The transmitter of the Wake-Up Transceiver is utilized to transmit wireless signals, for example, to relay a wake-up signal, without requiring activation of the otherwise dormant standards-based radio.

V. SUMMARY OF THE INVENTION

The present invention includes many aspects and features.

In a first aspect of the invention, a wireless communication device for receiving and transmitting wireless signals includes: a transceiver capable of receiving a wireless signal; and a standards-based radio capable of activation in response to receipt of a wireless signal by the transceiver.

In a feature of this aspect, the transceiver is capable of receiving a wireless signal transmitted to prompt activation of the standards-based radio.

In a feature of this aspect, the standards-based radio, when activated, is capable of receiving and transmitting wireless signals that convey sensor-acquired data.

In a feature of this aspect, the transceiver consumes less power in receiving a wireless signal than does the standards-based radio in receiving a wireless signal.

In a feature of this aspect, the transceiver includes a receiver capable of receiving a wireless signal transmitted to prompt activation of the standards-based radio; and a transmitter capable of, in response to a reception by the receiver of a wireless signal transmitted to prompt activation of the standards-based radio, transmitting a wireless signal for another transceiver to prompt activation of another standards-based radio.

In a feature of this aspect, the device further includes a sensor capable of acquiring sensor data, and the standards-based radio is capable of transmitting the sensor data.

In accordance with this feature, the sensor may be disposed for monitoring a container, and the sensor may be a seal monitor capable of detecting openings and/or closures of the container; a camera, a microphone, a motion detector, a light detector, or an RF signal detector; a chemical sensor; and/or a sensor that is sensitive to the contents of the container so as to detect any leaks from the container.

In another aspect of the invention, a self-contained wireless communications device includes: a low power radio frequency (LPRF) communications component capable of powering down to conserve energy and capable of powering up in response to an electronic signal, the LPRF communications component including a first transmitter and a first receiver;

and a second transmitter and a second receiver, the second receiver being configured to screen a radio frequency broadcast and provide, on the basis of specific data identified therein, the electronic signal to the LPRF communications component in order to power up the LPRF communications component, and the second transmitter being configured to transmit the radio frequency broadcast received by the second receiver. In accordance with this aspect, the second receiver is adapted to draw less current than the LPRF communications component while awaiting receipt of and listening for a radio frequency broadcast.

In a feature of this aspect, the second transmitter is configured to transmit the radio frequency broadcast irrespective of the specific data identified in the radio frequency broadcast.

In a feature of this aspect, the second transmitter is configured to transmit the radio frequency broadcast irrespective of whether the LPRF communications component is powered up.

In a feature of this aspect, the wireless communications device is battery operated.

In a feature of this aspect, the wireless communications device is of a size capable of being handheld.

In a feature of this aspect, the LPRF communications component comprises a standards-based Bluetooth radio and wherein the second transmitter and second receiver do not comprise a standards-based Bluetooth radio.

In a feature of this aspect, the LPRF communications component communicates in accordance with a first protocol, and wherein the second transmitter and the second receiver communicate in accordance with a second protocol that is different from the first protocol.

In a feature of this aspect, the device further includes a sensor component physically connected to the LPRF communications component for data exchange there between, the wireless communications device being a remote sensor interface (RSI) in an RSI network. The sensor component may include, for example, a global positioning system (GPS) receiver.

In addition to the aforementioned aspects and features of the present invention, it should be noted that the present invention further includes the various possible combinations of such aspects and features.

VI. BRIEF DESCRIPTION OF THE DRAWINGS

One or more embodiments of the present invention will be described in detail with reference to the accompanying drawings which are briefly described below, wherein the same elements are referred to with the same reference numerals, and wherein various elements are not necessarily shown in conformance to any particular absolute or relative scale.

VII. DETAILED DESCRIPTION

Figure 1:
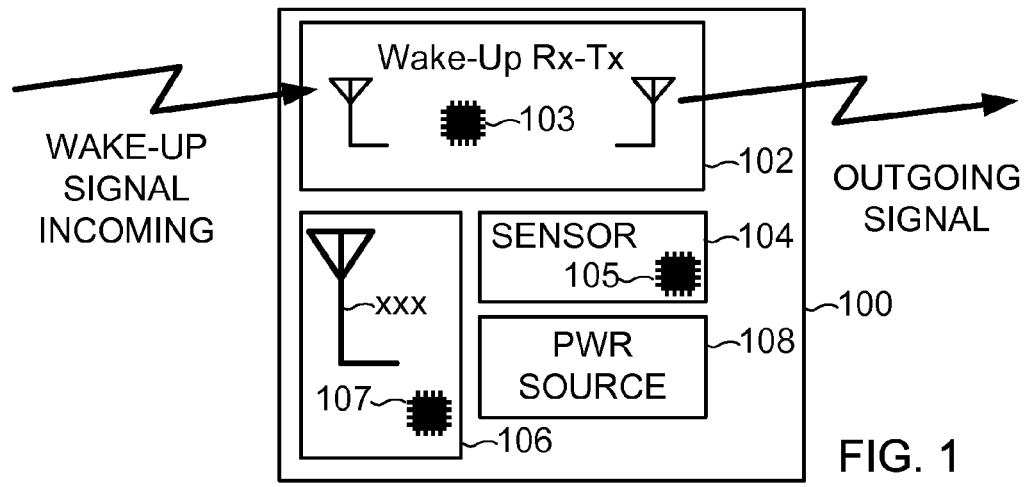
FIG. 1 is a diagram of a remote sensor interface (RSI) according to a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers,"as well as describes "a picnic basket having crackers, wherein the picnic basket further has cheese."

Referring now to the drawings, one or more preferred embodiments of the present invention are next described. The following description of one or more preferred embodiments is merely exemplary in nature and is not intended to limit the invention or uses.

Turning now to FIG. 1, a remote sensor interface (RSI) 100 according to the present invention is diagrammatically shown to include: a Wake-Up Transceiver 102 that includes components for transmitting as well as receiving wireless signals (a "Wake-Up Rx-Tx"); a sensor interface 104 for acquiring data from one or more sensors associated with the RSI 100; a standards-based radio 106 for two-way wireless communications for exchanging data with one or more other RSIs and/or one or more gateways; and, an electrical power source 108, such as a battery.

In order to reduce unnecessary power consumption, the standards-based radio 106, which has a relatively high power consumption rate when active, is generally dormant until awakened. The Wake-Up Transceiver 102, which has a relatively low power consumption rate compared to that of the standards-based radio 106, generally remains active for detecting incoming wireless wake-up signals. Upon receipt of a wake-up signal addressed to the RSI 100, the Wake-Up Transceiver 102 generally wakes-up the standards-based radio 106 for receiving and transmitting data via the standards-based radio 106. Those components of the RSI that consume relatively high amounts of power thereby are generally active only when needed.

The Wake-up Transceiver 102 includes components for receiving wireless wake-up signals, which components are generally referred to herein as a "Wake-Up Receiver" or "Wake-Up Rx." The Wake-Up Receiver is generally similar to the "WT Component" described in detail, for example, in incorporated International Patent Application Publication No. WO 03/098851 A1 (and which international application entered the U.S. national phase and published as U.S. Patent Application Publication No. US 2005/0215280, also incorporated herein by reference). The Wake-Up Receiver moreover has been occasionally referred to as a "tag turn-on circuit" or "TTOC." The process for determining whether to wake-up the standards-based radio of the RSI furthermore may include a number of steps that are performed in a particular sequence, especially if the RSI 100 is disposed in a noisy radio-frequency (RF) environment.

In addition to the Wake-Up Receiver, and in accordance with the present invention, the Wake-Up Transceiver 102 additionally includes components for transmitting wireless signals, which components are generally referred to herein as a "Wake-Up Transmitter" or "Wake-Up Tx." The Wake-Up Transmitter occasionally has been referred to as a "tag turn-on" or "TTO," and the Wake-Up Transmitter is capable of sending signals to Wake-Up Receivers, TTOCs, or the like, for wake-up of RSIs and/or gateways.

In the embodiment of the RSI 100 diagrammatically shown in FIG. 1, the Wake-Up Transceiver 102 includes a microprocessor 103, the sensor interface 104 includes a microprocessor 105, and the standards-based radio 106 includes a microprocessor 107. Nonetheless, in other embodiments of the RSI 100, these components share a single microprocessor. Indeed, these components can be controlled by any number of microprocessors according to the invention. Alternatively, microcontrollers or application specific integrated circuits (ASICs) may be used.

Figures 6, 7:
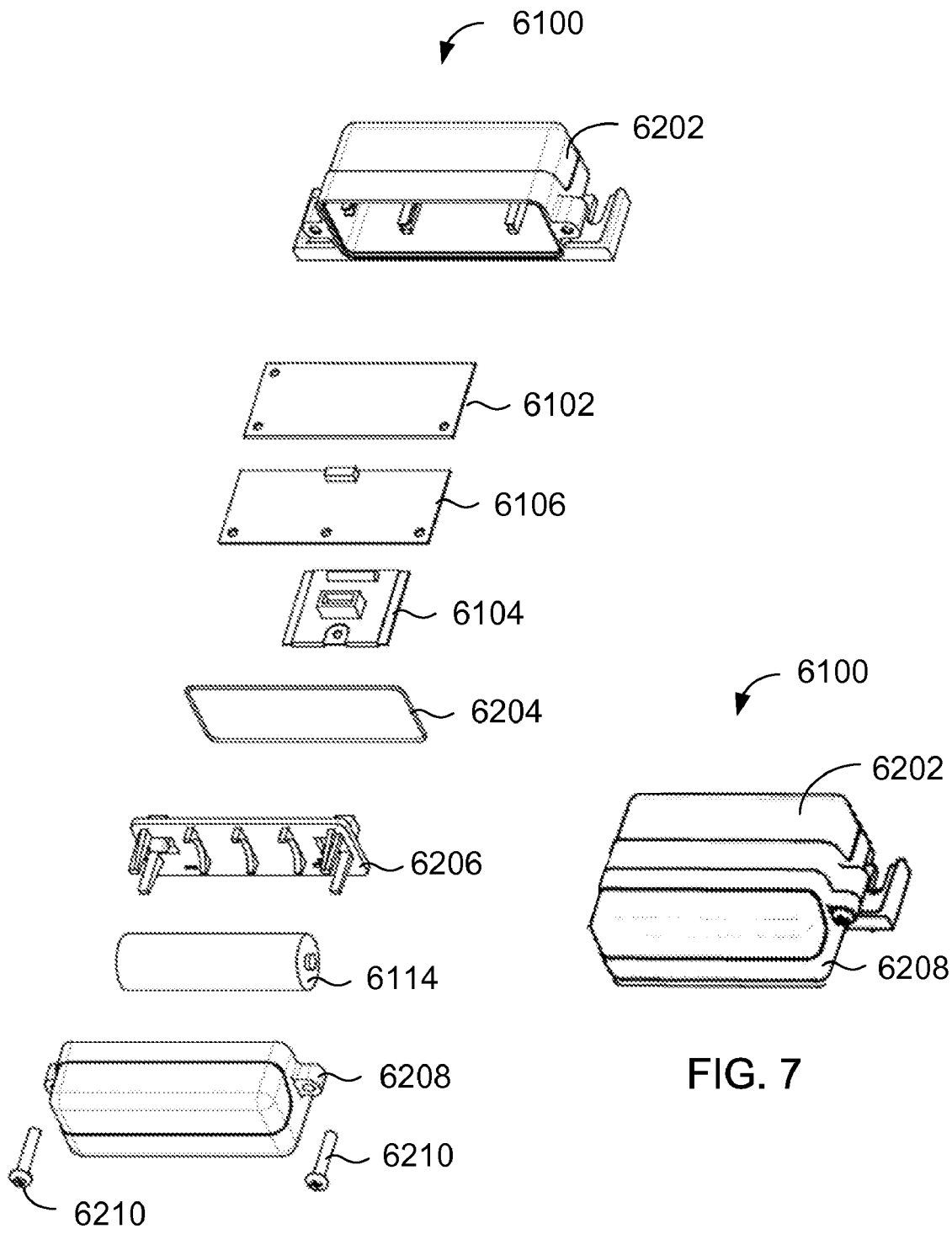
FIG. 6 is an exploded perspective view of a preferred embodiment of an RSI of FIG. 1 having the Wake-Up Transceiver of FIG. 2A.
FIG. 7 is an assembled perspective view of the RSI of FIG. 6.

Also, as generally illustrated and discussed herein, the Wake-Up Transceiver 102, sensor interface 104 and standards-based radio 106 comprise respective electronic circuits on respective printed circuit assembly (PCA) cards, for example, as shown in FIG. 6 (see components 6102, 6104, and 6106). Nonetheless, in some embodiments of the invention, these components are integral to a single PCA card. Indeed, these components can be arranged on any number of PCA cards according to the invention. Moreover, according to the invention, these components can be arranged on any other physical structures without regard to PCA cards. For example, these components could be arranged on a PCMCIA (PC) Card.

Furthermore, the Wake-Up Transceiver 102, sensor interface 104 and standards-based radio 106 are each integral to a respective printed circuit board (PCB) according to the illustrated embodiment of the RSI 100. Nonetheless, these components are constructed on or as other circuit substrates in other embodiments of the invention. For example, in one embodiment, the Wake-Up Transceiver is miniaturized by utilizing an ASIC programmed to provide transceiver circuit functions. In another embodiment, the Wake-Up Transceiver includes a standard cell, that is, a semiconductor substrate having hard printed circuits thereon to provide transceiver circuit functions.

Thus, without limiting the scope of the descriptions herein, and in order to provide an understanding of at least one embodiment of the present invention, a preferred embodiment is discussed herein with regard to the Wake-Up Transceiver, sensor interface and standards-based radio each comprising respective electronic circuits and microprocessors on respective PCA cards that are separately received by a protective housing, for example, the first housing 6202 of FIG. 6.

Figure 2A:
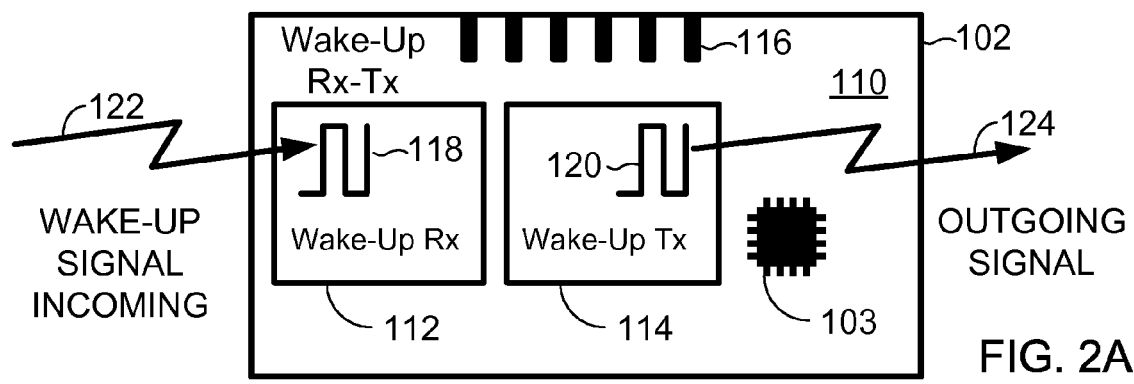
FIG. 2A is a diagram of a "Wake-Up Transceiver" according to a preferred embodiment of the present invention.

Turning now to FIG. 2A, a preferred embodiment of the Wake-Up Transceiver 102 is shown as a PCA card that includes, on a single PCB 110, a low-power RF receiver, namely the Wake-Up Receiver 112 (Wake-Up Rx), a low-power RF transmitter, namely the Wake-Up Transmitter 114 (Wake-Up Tx), and a microprocessor 103. The Wake-Up Receiver 112 includes RF analog receiver circuitry. Similarly, the Wake-Up Transmitter 114 includes RF analog transmitter circuitry. A number of electrical contacts 116 for abutting corresponding electrical contacts within a housing of the RSI are provided for conducting electrical power to the Wake-Up Transceiver 102 and for conveying electronic signals between the transceiver and other electronic components of the RSI. In this embodiment, the Wake-Up Receiver 112 includes a low-power receiver and an etched antenna 118 on the PCB 110; and, the Wake-Up Transmitter 114 includes a low-power transmitter and another etched antenna 120 on the same PCB 110.

As additionally shown in FIG. 2A, the Wake-Up Transceiver 102 is at least capable of: receiving an incoming wake-up signal 122 via the Wake-Up Receiver 112; and, transmitting an outgoing signal 124 via the Wake-Up Transmitter 114. In certain preferred embodiments, a wake-up signal received by the Wake-Up Receiver 112 is relayed or retransmitted by the Wake-Up Transmitter 114 as the outgoing signal 124. In other embodiments, the outgoing signal transmitted by the Wake-Up Transmitter 114 originates from the RSI 100 (FIG. 1).

The Wake-Up Transceiver 102 preferably operates as an RF device in the industrial, scientific, and medical (ISM) band. Operation in the 2.4 Gigahertz (GHz) range is of particular value in global distribution and utilization of transceivers in avoiding violating varying restrictions and regulations worldwide.

Figure 4:
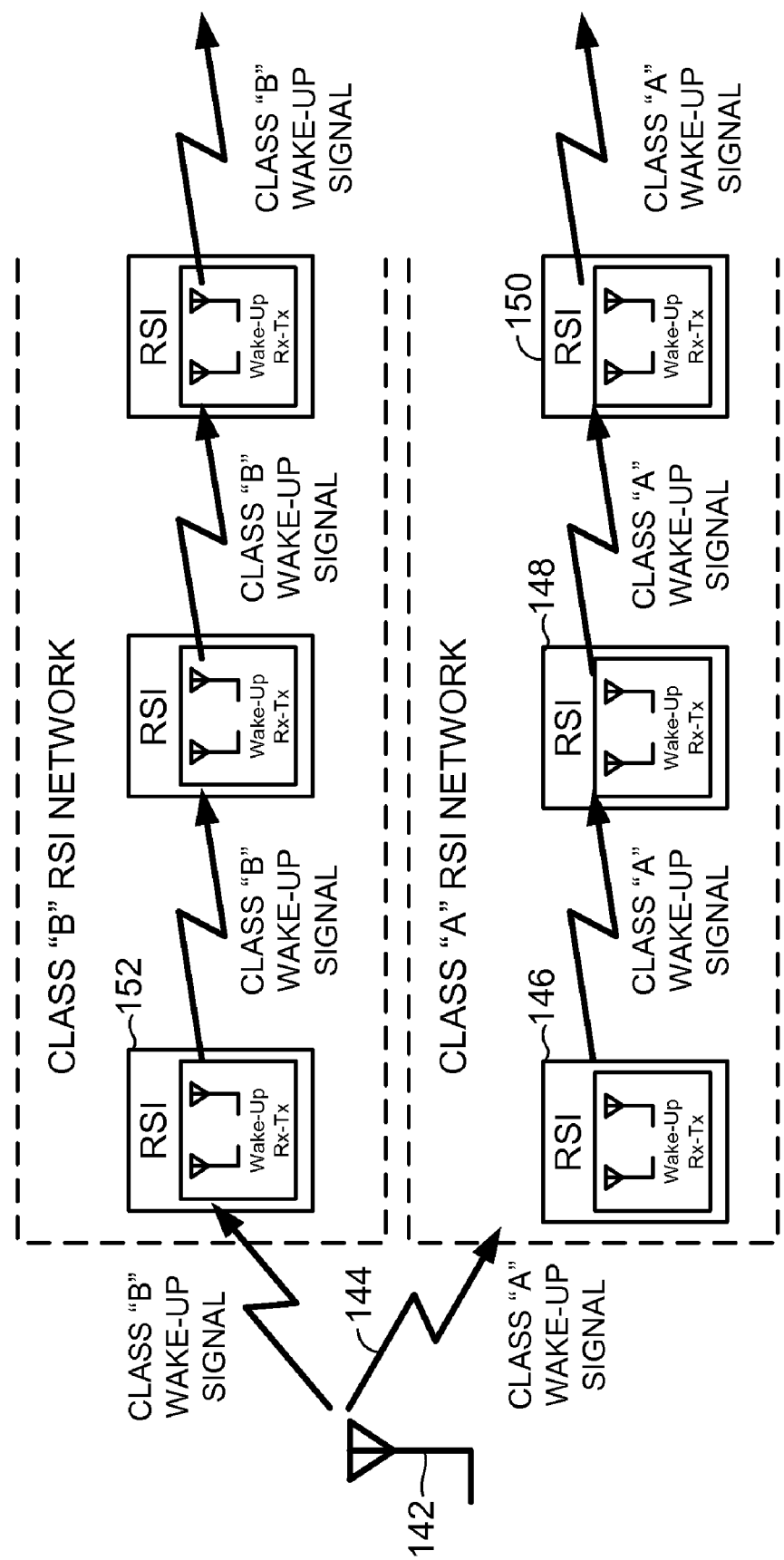
FIG. 4 illustrates RSIs receiving and sending class-based wake-up signals according to a preferred embodiment of the invention.

According to the needs of the entity engaged in utilizing the Wake-Up Transceiver, each signal received and transmitted by the Wake-Up Transceiver is optionally structured to convey an identification of one or more particular receivers (or devices in which the receivers are contained) for which the signal is intended, or, as in the example illustrated in FIG. 4, an identification of one or more classes of receivers (or such devices) for which the signal is intended. Each signal furthermore is optionally structured to convey payload data such as readings from one or more sensors that monitor conditions such as, for example, temperature, humidity, and vibration (discussed in further detail below). Outgoing signals also can be directly responsive to incoming signals to provide a roll-call functionality, wherein a Wake-Up Transceiver receives a wake-up signal and transmits a response in order to at least confirm its presence, operability, and receipt of the wake-up signal.

Figure 2B:
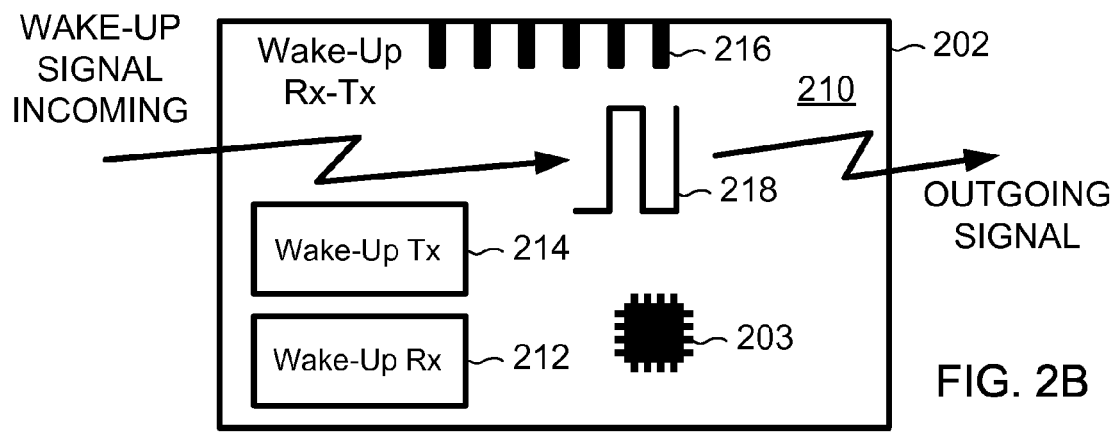
FIG. 2B is a diagram of a "Wake-Up Transceiver" according to another embodiment of the present invention.

Turning now to FIG. 2B, another embodiment of a Wake-Up Transceiver 202 is shown as a PCA card that includes, on a single PCB 210, a low-power RF receiver, namely the Wake-Up Receiver 212 (Wake-Up Rx), a low-power RF transmitter, namely the Wake-Up Transmitter 214 (Wake-Up Tx), and a microprocessor 203. The Wake-Up Receiver 212 includes RF analog receiver circuitry. Similarly, the Wake-Up Transmitter 214 includes RF analog transmitter circuitry. A number of electrical contacts 216 for abutting corresponding electrical contacts within a housing of the RSI are provided for conducting electrical power to the Wake-Up Transceiver 202 and for conveying electronic signals between the transceiver and other electronic components of the RSI. In this embodiment, the Wake-Up Receiver and the Wake-Up Transmitter utilize a single dual-purpose etched antenna 218 for both receiving and transmitting wireless signals.

In yet another embodiment, the Wake-Up Transceiver operates to receive and sends wireless signals without regard to awakening other components of an RSI. In such an embodiment (not illustrated), the Wake-Up Transceiver itself comprises a stand alone transceiver that includes a power source, such as a battery, and is capable of receiving signals intended to prompt a response from the Wake-Up Transceiver as opposed to the standards-based radio associated with the Wake-Up Transceiver. In some instances, the response from the Wake-Up Transceiver includes a relay or retransmission of the received signal for receipt by other wireless devices. In another example, the Wake-Up Transceiver receives and further transmits a class-based signal prompting roll-call responses from multiple transceivers that are members of a class.

In other instances, the response from the Wake-Up Transceiver includes data from a sensor that may be directly associated with the Wake-Up Transceiver itself. With further regard to such scenarios, the Wake-Up Transceiver may be configured to wake-up a sensor thereby prompting the sensor to acquire data (i.e., take a reading). The sensor acquired data then may be communicated by the Wake-Up Transceiver, all without awakening a standards-based radio of the RSI, if even provided in the particular RSI. Indeed, an RSI in accordance with at least one aspect of the invention may not include a standards-based radio (omission of the standards-based radio from the RSI may reduce costs and save power consumption, and may be preferred if communications of the sensor acquired data do not require, for example, encryption). The sensor-acquired data may be carried in the payload data of the signal from the Wake-Up Transceiver and may include data relating to, for example, temperature, humidity, vibration, and/or status of a container seal (e.g., whether a container has been opened). In this respect, the Wake-Up Transceiver functions as a final destination point for a communication sent from, for example, a gateway or server either directly to the Wake-Up Transceiver, or indirectly to the Wake-Up Transceiver through one or more hops via other RSIs.

Figure 3:
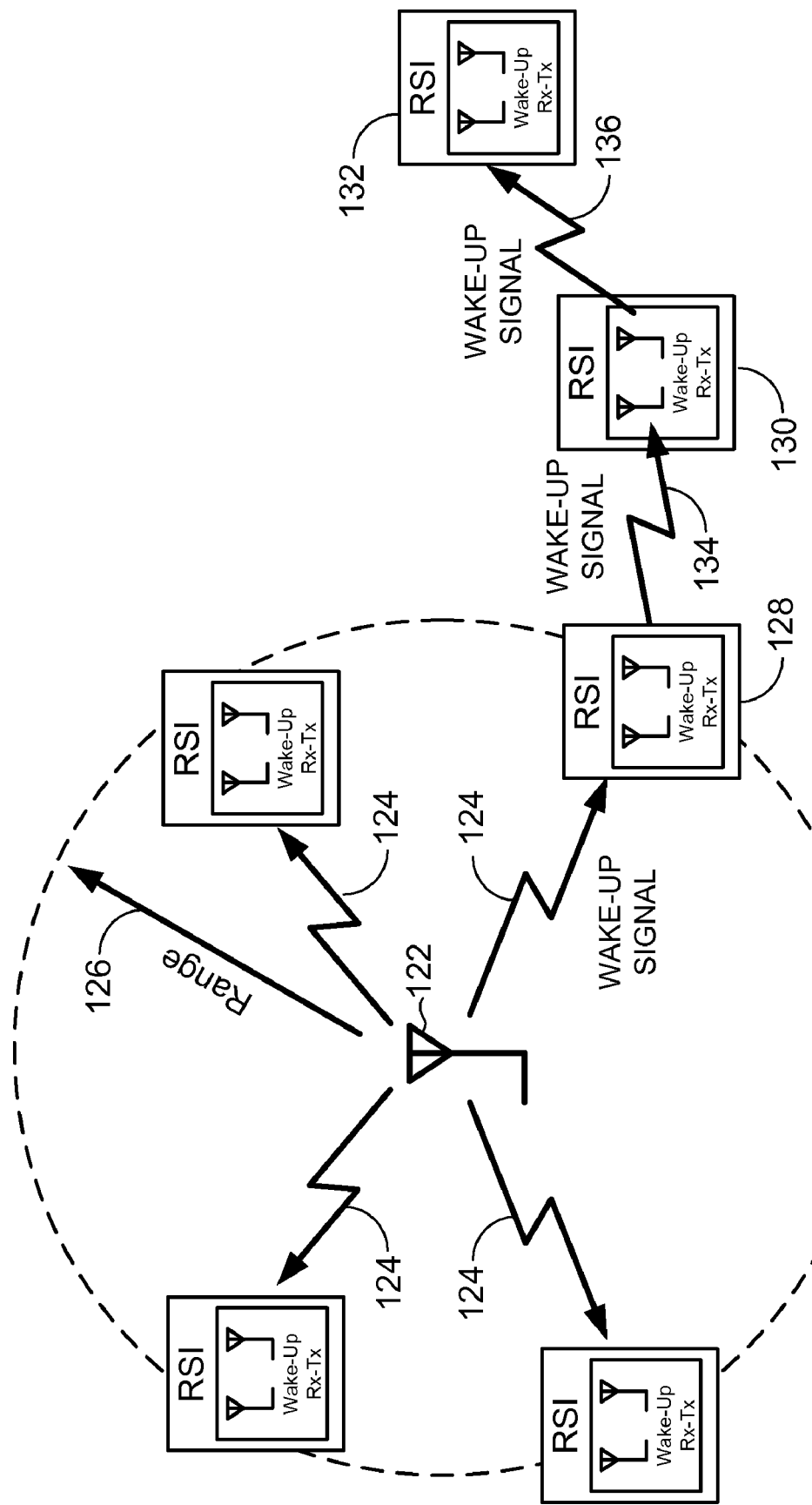
FIG. 3 illustrates RSIs receiving and sending wake-up signals according to a preferred embodiment of the invention.

The benefit of the relay ability of a Wake-Up Transceiver to promptly retransmit a wake-up signal is illustrated with reference to FIG. 3. As shown in FIG. 3, a gateway 122 broadcasts an original wake-up signal 124 to multiple RSIs within an effective broadcast range 126 of the gateway 122. Particular RSIs 130,132, however, are out of broadcast range of the wake-up signal 124 transmitted from the gateway 122. In accordance with the invention, an RSI 128 having a Wake-Up Transceiver ("Wake-Up Rx-Tx") receives the wake-up signal 124 from the gateway 122 and transmits a wake-up signal 134 that reaches the RSI 130. Similarly, the RSI 130 receives the wake-up signal 134 and transmits a wake-up signal 136 that reaches the RSI 132. Thus, RSIs 130,132—though out of range of the gateway 122—nevertheless are awoken (at least indirectly) by the original wake-up signal 124 broadcast from the gateway 122.

Of course, in retransmitting or relaying wake-up signals, an RSI preferably will not continuously relay a wake-up signal each time a wake-up signal is received. Such a simplistic algorithm may result in an endless loop of wake-up signals being transmitted back and forth between two or more RSIs. In this regard, an RSI and, in particular, a Wake-Up Transceiver of the RSI in accordance with the present invention, preferably is configured not to retransmit or relay a wake-up signal that has been previously received by the Wake-Up Transceiver.

While various methods are available to implement such a restriction and will be apparent to the Ordinary Artisan, a preferred technique comprises including a unique or quasi-unique identifier in each wake-up signal. In this case, the Wake-Up Transceiver preferably includes components for reading the identifier and comparing it to identifiers of previous wake-up signals. In the instance that the identifier is found to match an identifier of a previously received wake-up signal, the currently received wake-up signal is not relayed or retransmitted, and no wake-up signal consequently is transmitted by the Wake-Up Transceiver based on receipt of the current wake-up signal.

Additionally, a Wake-Up Transceiver may be configured to retransmit or relay wake-up signals upon receipt with regard to a class to which the wake-up signal may be targeted. Class-based networks and wake-up signals directed to one or more particular classes are disclosed, for example, in incorporated Patent Application Publication No. US 2004/0082296 A1 and/or in incorporated International Patent Application WO 03/098851 A1. In this case, the Wake-Up Transceiver preferably includes components for reading the class targeted by the wake-up signal and comparing it to the class(es) assigned to the RSI. In the instance that the targeted class of the wake-up signal is found to match an assigned class of the RSI, then not only is the standards-based radio of the RSI awoken by the Wake-Up Transceiver, but the wake-up signal is retransmitted or relayed by the Wake-Up Transceiver.

FIG. 4 illustrates an example in which a class-based wake-up signal is relayed. In FIG. 4, multiple RSIs 146,148,150 are illustrated as being members of a first class identified nominally as class "A", and a gateway 142 is illustrated transmitting a wake-up signal 144 addressed to class "A". A particular RSI 146 that is a member of the intended recipient class receives the class "A" wake-up signal 144 from the gateway 142 and, thereafter, transmits a class "A" wake-up signal. RSI 148 that is out of range of the wake-up signal 144 from the gateway 142 and that is of class "A" nonetheless then is awakened by receipt of the relayed wake-up signal from RSI 146 directed to its class.

Similarly, RSI 148 that is a member of the intended recipient class receives the class "A" wake-up signal from the RSI 146 and, thereafter, transmits a class "A" wake-up signal that is received by RSI 150. RSI 150 that is out of range of the wake-up signal 144 from the gateway 142 and that is out of range from the RSI 146 nonetheless then is awakened by receipt of the relayed wake-up signal from RSI 148 directed to its class.

In another example, the gateway 142 transmits a class "B" wake-up signal that reaches a class "B" RSI 152, and additional class "B" RSIs thereafter are awakened by subsequent transmissions of class "B" wake-up signals by RSIs of class "B".

With further regard to FIG. 4, the class "A" and class "B" RSIs are shown for clarity as arranged in separate rows; however, it will be appreciated that the RSIs may be disposed in any diverse physical arrangements and that the RSIs may be static or dynamic. Indeed, an RSI may be disposed in a warehouse, in a container, or even on a vehicle. Moreover, there may be numerous classes in which the RSIs are members.

Figure 5:
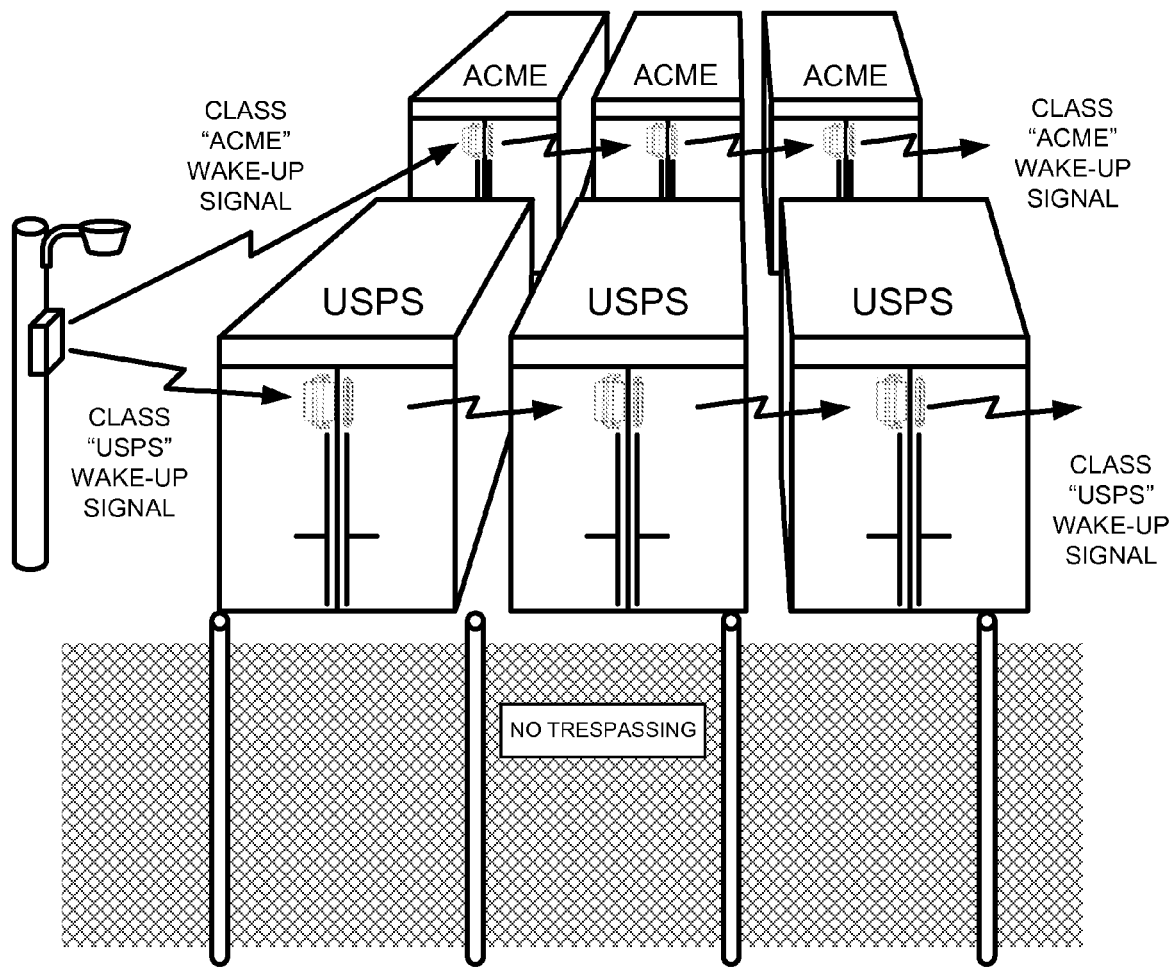
FIG. 5 illustrates a commercial implementation of the preferred embodiment of FIG. 4.

A commercial implementation of the preferred embodiment of FIG. 4 of relaying class-based wake-up signals is illustrated in FIG. 5. The exemplary classes of FIG. 5 include an "ACME" class, representing shipping containers of ACME IMPORTS INC., and a "USPS" class, representing shipping containers of the U.S. Postal Service. Importantly, wake-up signals intended to awaken RSIs of the ACME class do not awaken RSIs of the USPS class. Moreover, the USPS RSIs do not consume power in relaying or retransmitting wake-up signals intended for the ACME RSIs, and the ACME RSIs do not consume power in relaying or retransmitting wake-up signals intended for the USPS RSIs. This is particularly important, for example, when different parties are responsible for the expense of servicing and replacing power sources for the respective RSIs.

In FIG. 6, a preferred embodiment of an RSI 6100 of FIG. 1 is shown in exploded perspective view to include: a first housing 6202 for receiving electronic components such as a Wake-Up PCA Card 6102, a PCA Card 6106 comprising a standards-based radio for two-way wireless communications, and a PCA Card 6104 comprising a sensor interface; a seal 6204 and a cover 6206 for sealing the electronic components within the first housing 6202; and, a second housing 6208 for receiving a power source 6114. The second housing attaches to the first housing by connectors 6210 such as screws. Slots are formed in a base of the RSI for mounting of the RSI to a surface, such as that of a shipping or maritime container.

The standards-based radio of PCA Card 6106, which is also shown diagrammatically as standards-based radio 106 in FIG. 1, preferably operates as a WiFi or Bluetooth RF device. Benefits supported by the device include: high data rate reception, transmission, and relaying; long range transmission; sensitive (low RF signal strength) reception; data encryption; continuous RF link maintenance; and, multiple connections with other RF devices. These benefits, however, come at the expense of the energy of the power source 6114, and thus, utilization of the standards-based radio is minimized.

A PCA card 6104 comprising a sensor interface preferably is provided for acquiring data from one or more sensors associated with the RSI. Insofar as the RSI is associated with assets, such as shipping containers and contents thereof, the RSI preferably is capable of interfacing with sensors that, for example, monitor the assets, environmental characteristics of the assets, and/or geographical locations of the assets. In some embodiments, the sensor actually may be included within the RSI; in other embodiments, the sensor may be external to the RSI but nevertheless disposed in electronic communication with the sensor interface for data exchange therebetween. Electronic communication between the sensor interface and a sensor is exchanged wirelessly in some embodiments of the invention and by way of cabled connections in other embodiments. In at least one embodiment, the sensor interface comprises a multi-conductor connector, such as a ribbon cable, that passes from the interior of an RSI and to an external sensor, sensor array, or docking station that receives the RSI. Exemplary sensors include, but are not limited to, electronic seals, magnetic seals, cameras, microphones, temperature sensors, humidity sensors, radiation sensors, and motion sensors.

The electronic components of FIG. 6 each have a number of electrical contacts corresponding to electrical contacts within the first housing 6202. In assembling the RSI, each component is pressed into an available slot in the first housing with the electrical contacts of the component abutting corresponding electrical contacts of the first housing. The components are preferably easily installed and removed for replacement, upgrade, or servicing much like card components of a personal computer. In FIG. 7, the RSI 6100 of FIG. 6 is shown as assembled.

Based on the foregoing description, it will be readily understood by those persons skilled in the art that the present invention is susceptible of broad utility and application. Accordingly, while one or more embodiments of the present invention have been described herein in detail, it is to be understood that this disclosure is only illustrative and exemplary and is made merely for the purpose of providing a full and enabling disclosure of the invention. The foregoing disclosure is not intended to be construed to limit the present invention or otherwise exclude any other embodiments, adaptations, variations, modifications or equivalent arrangements, the scope of the invention being limited only by the claims of an issued patent and the equivalents thereof.

What is claimed is:

1. A wireless data communication device, comprising:
   (a) a radio configured to power down to conserve energy and to power up in response to receipt of a wired electronic signal, the radio comprising a first receiver and a first transmitter;
   (b) a wake-up transceiver comprising a second transmitter and a second receiver, the wake-up transceiver configured to,
      (i) screen radio frequency broadcasts, received by the second receiver, for specific data therein that identifies the radio frequency broadcast as a wake-up signal,
      (ii) provide the wired electronic signal to the radio in order to power up the radio upon receipt, by the second receiver, of a wake-up signal, and
      (iii) transmit radio frequency broadcasts, using the second transmitter, that include specific data therein that identifies the radio frequency broadcasts as wake-up signals; and
   (c) a power source for powering at least one of the radio and the wake-up transceiver;
   (d) wherein the second receiver of the wake-up transceiver is configured to draw less current than the first receiver of the radio while screening radio frequency broadcasts for specific data therein that identifies the radio frequency broadcast as a wake-up signal; and (e) wherein the second transmitter of the wake-up transceiver is configured to draw less current than the first transmitter of the radio when transmitting radio frequency broadcasts that include specific data therein that identifies the radio frequency broadcasts as wake-up signals.

2. The wireless data communication device of claim 1, wherein the wake-up transceiver is configured to transmit radio frequency broadcasts, using the second transmitter, when the radio is powered down.

3. The wireless data communication device of claim 1, further comprising a sensor associated with the wireless data communication device.

4. The wireless data communication device of claim 3, wherein the wake-up transceiver is configured to transmit signals that include data acquired from the sensor, using the second transmitter, when the radio is powered down.

5. The wireless data communication device of claim 4, wherein the wake-up transceiver is configured to activate the sensor for taking readings when the radio is powered down.

6. The wireless data communication device of claim 5, wherein the sensor is a component of the wireless data communication device.

7. The wireless data communication device of claim 3, wherein the radio is configured to transmit signals that include data acquired from the sensor, using the first transmitter, when the radio is powered up.

8. The wireless data communication device of claim 7, wherein the sensor is a component of the wireless data communication device.

9. The wireless data communication device of claim 3, further comprising a protective housing within which are contained the radio, the wake-up transceiver, the sensor, and the power source.

10. The wireless data communication device of claim 3, wherein the power source powers the radio and the sensor, and further comprising a second power source configured to power the wake-up transceiver.

11. The wireless data communication device of claim 10, wherein the radio and the wake-up transceiver are contained on a printed circuit board (PCB), and wherein the PCB further comprises a sensor interface through which data is received from the sensor.

12. The wireless data communication device of claim 1, wherein the radio comprises a standards-based radio that communicates using a first protocol, and wherein the wake-up transceiver communicates using a second, different protocol.

13. An apparatus comprising:
(a) a shipping container;
(b) a remote sensor interface(RSI) attached to the shipping container, the RSI comprising a protective housing containing,
    (i) a radio configured to power down to conserve energy and to power up in response to receipt of a wired electronic signal, the radio comprising a first receiver and a first transmitter,
    (ii) a wake-up transceiver comprising a second transmitter and a second receiver, the wake-up transceiver configured to,
        (A) screen radio frequency broadcasts, received by the second receiver, for specific data therein that identifies the radio frequency broadcast as a wake-up signal,
        (B) provide the wired electronic signal to the radio in order to power up the radio upon receipt, by the second receiver, of a wake-up signal, and
        (C) transmit radio frequency broadcasts, using the second transmitter, that include specific data therein that identifies the radio frequency broadcasts as wake-up signals, and
    (iii) a power source configured to power at least one of the radio and the wake-up transceiver,
    (iv) wherein the second receiver of the wake-up transceiver is configured to draw less current than the first receiver of the radio while screening radio frequency broadcasts for specific data therein that identifies the radio frequency broadcast as a wake-up signal, and
    (v) wherein the second transmitter of the wake-up transceiver is configured to draw less current than the first transmitter of the radio when transmitting radio frequency broadcasts that include specific data therein that identifies the radio frequency broadcasts as wake-up signals, and
(c) at least one sensor with which the RSI is configured to receive data for transmitting from the shipping container to a network external to the shipping container, the sensor configured to acquire data pertaining to at least one of an environmental characteristic, status, and geographical location of the shipping container;
(d) whereby at least one of an environment characteristic, status, and geographical location of the shipping container may be remotely monitored.

14. The apparatus of claim 13, wherein the at least one sensor is contained within the protective housing of the RSI and is powered by the power source contained within the protective housing.

15. The apparatus of claim 13, wherein the at least one sensor is externally located to the protective housing of the RSI.

16. The apparatus of claim 15, wherein the at least one sensor is configured to wirelessly communicate with the RSI.

17. The apparatus of claim 15, wherein the at least one sensor is configured to communicate with the RSI through a wired connection.

18. The apparatus of claim 13, wherein the at least one sensor comprises at least one of an electronic seal for monitoring a door of the shipping container, a magnetic seal for monitoring a door of the shipping container, a camera, a microphone, a temperature sensor, a humidity sensor, a radiation sensor, a motion sensor, a radio frequency signal detector, and a global positioning system (GPS) receiver.

19. A remote sensor network for monitoring shipping containers, comprising:
(a) a first plurality of shipping containers, each shipping container including,
    (i) a remote sensor interface(RSI) attached to the shipping container, the RSI comprising a protective housing containing,
        (A) a radio configured to power down to conserve energy and to power up in response to receipt of a wired electronic signal, the radio comprising a first receiver and a first transmitter,
        (B) a wake-up transceiver comprising a second transmitter and a second receiver, the wake-up transceiver configured to,
            (1) screen radio frequency broadcasts, received by the second receiver, for specific data therein that identifies the radio frequency broadcast as a wake-up signal, (2) provide the wired electronic signal to the radio in order to power up the radio upon receipt, by the second receiver, of a wake-up signal, and (3) transmit radio frequency broadcasts, using the second transmitter, that include specific data therein that identifies the radio frequency broadcasts as wake-up signals, and (B) a power source configured to power at least one of the radio and the wake-up transceiver, (C) wherein the second receiver of the wake-up transceiver is configured to draw less current than the first receiver of the radio while screening radio frequency broadcasts for specific data therein that identifies the radio frequency broadcast as a wake-up signal, and (D) wherein the second transmitter of the wake-up transceiver is configured to draw less current than the first transmitter of the radio when transmitting radio frequency broadcasts that include specific data therein that identifies the radio frequency broadcasts as wake-up signals, and (ii) at least one sensor with which the RSI is configured to receive data for transmitting from the shipping container to a network external to the shipping container, the sensor configured to acquire data pertaining to at least one of an environmental characteristic, status, and geographical location of the shipping container;

(b) gateways configured to transmit wakeup signals to the respective RSIs of the shipping containers for communications therewith, each gateway further configured to communicate over at least one of the Internet, a cellular network, and a satellite network; and (c) a server configured to communicate with each gateway over at least one of the Internet, a cellular network, and a satellite network for receiving and processing sensor acquired data from the shipping containers communicated by the RSIs, whereby at least one of an environment characteristic, status, and geographical location of each shipping container may be remotely monitored.

20. The remote sensor network of claim 19, wherein each gateway is configured to transmit a signal other than a wake-up signal to RSIs of the shipping containers, and wherein each respective wake-up transceiver of the RSIs is configured to receive a signal other than a wake-up signal transmitted by a gateway when the radio of the respective RSI is powered down and respond thereto without causing the radio of the respective RSI to power up.

* * * * *